United States Patent
Iikura (10) Patent No.: US 8,731,428 B2
(45) Date of Patent: May 20, 2014

(54) IMAGE-FORMING APPARATUS WITH GROUNDED METALLIC SUPPORTING PORTION

(75) Inventor: Kazuaki Iikura, Yokohama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 652 days.

(21) Appl. No.: 12/907,574

(22) Filed: Oct. 19, 2010

(65) Prior Publication Data

US 2011/0206413 A1 Aug. 25, 2011

(30) Foreign Application Priority Data

Feb. 25, 2010 (JP) .................................. 2010-040948

(51) Int. Cl.
*G03G 15/00* (2006.01)

(52) U.S. Cl.
USPC ............................................ 399/90; 399/117

(58) Field of Classification Search
USPC ...................................... 399/90, 117
See application file for complete search history.

(56) References Cited

U.S. PATENT DOCUMENTS

| 6,029,019 | A * | 2/2000 | Kawai .............................. 399/90 |
| 6,480,687 | B1 | 11/2002 | Kawai et al. |
| 2007/0009286 | A1 * | 1/2007 | Bryant et al. ................. 399/117 |
| 2007/0036582 | A1 * | 2/2007 | Okabe |
| 2009/0092414 | A1 | 4/2009 | Tomatsu |

FOREIGN PATENT DOCUMENTS

| JP | S60-043616 | 10/1986 |
| JP | S63-085073 A | 4/1988 |
| JP | S63-114755 U | 5/1988 |
| JP | H02-035163 | 3/1990 |
| JP | 2000-98682 A | 4/2000 |
| JP | 2001-92333 A | 4/2001 |
| JP | 2001-166667 A | 6/2001 |
| JP | 2006-53465 A | 2/2006 |
| JP | 2007-307710 A | 11/2007 |
| JP | 2009-015060 A | 1/2009 |
| JP | 2009-92859 A1 | 4/2009 |
| JP | 2009-230005 A | 10/2009 |

OTHER PUBLICATIONS

Japanese Office Action corresponding to Japanese Patent Application 2010-040948 issued on Nov. 19, 2013.
Japanese Office Action corresponding to Japanese Patent Application 2010-040948 issued on Nov. 13, 2013.
Japanese Office Action dated Feb. 13, 2014 corresponding to JP Application No. 2010-040948.

* cited by examiner

*Primary Examiner* — David Gray
*Assistant Examiner* — Laura Roth
(74) *Attorney, Agent, or Firm* — Sughrue Mion, PLLC (57) ABSTRACT

An image-forming apparatus such as a printer. The image forming apparatus includes: an image-forming unit, a bearing, and a metallic supporting portion. The image-forming unit includes an image holder having a rotating shaft, and forms an image on the image holder. The bearing is made of a conductive sintered compact and contacts and supports the rotating shaft so that the rotating shaft is able to rotate. The metallic supporting portion is electrically grounded, and has a cut that contacts and supports the bearing.

6 Claims, 7 Drawing Sheets

IMAGE-FORMING APPARATUS WITH GROUNDED METALLIC SUPPORTING PORTION

CROSS-REFERENCE TO RELATED APPLICATIONS

This application is based on and claims priority under 35 USC 119 from Japanese Patent Application No. 2010-040948 filed on Feb. 25, 2010.

BACKGROUND

1. Technical Field

The present invention relates to an image-forming apparatus.

2. Related Art

Generally in the art, image-forming apparatuses consist of a photosensitive drum having a rotating shaft charged by a charging device. Thus, electronically grounding of the rotating shaft of the photosensitive drum is required.

SUMMARY

According to an aspect of the invention, there is provided an image-forming apparatus including: an image-forming unit that includes an image holder having a rotating shaft, and forms an image on the image holder; a bearing made of a conductive sintered compact, that contacts and supports the rotating shaft so that the rotating shaft is able to rotate; and a metallic supporting portion that is electrically grounded, and has a cut that contacts and supports the bearing.

BRIEF DESCRIPTION OF THE DRAWINGS

Exemplary embodiments of the present invention will now be described in detail based on the following figures, wherein.

DETAILED DESCRIPTION

1. Exemplary Embodiment

Figure 1:
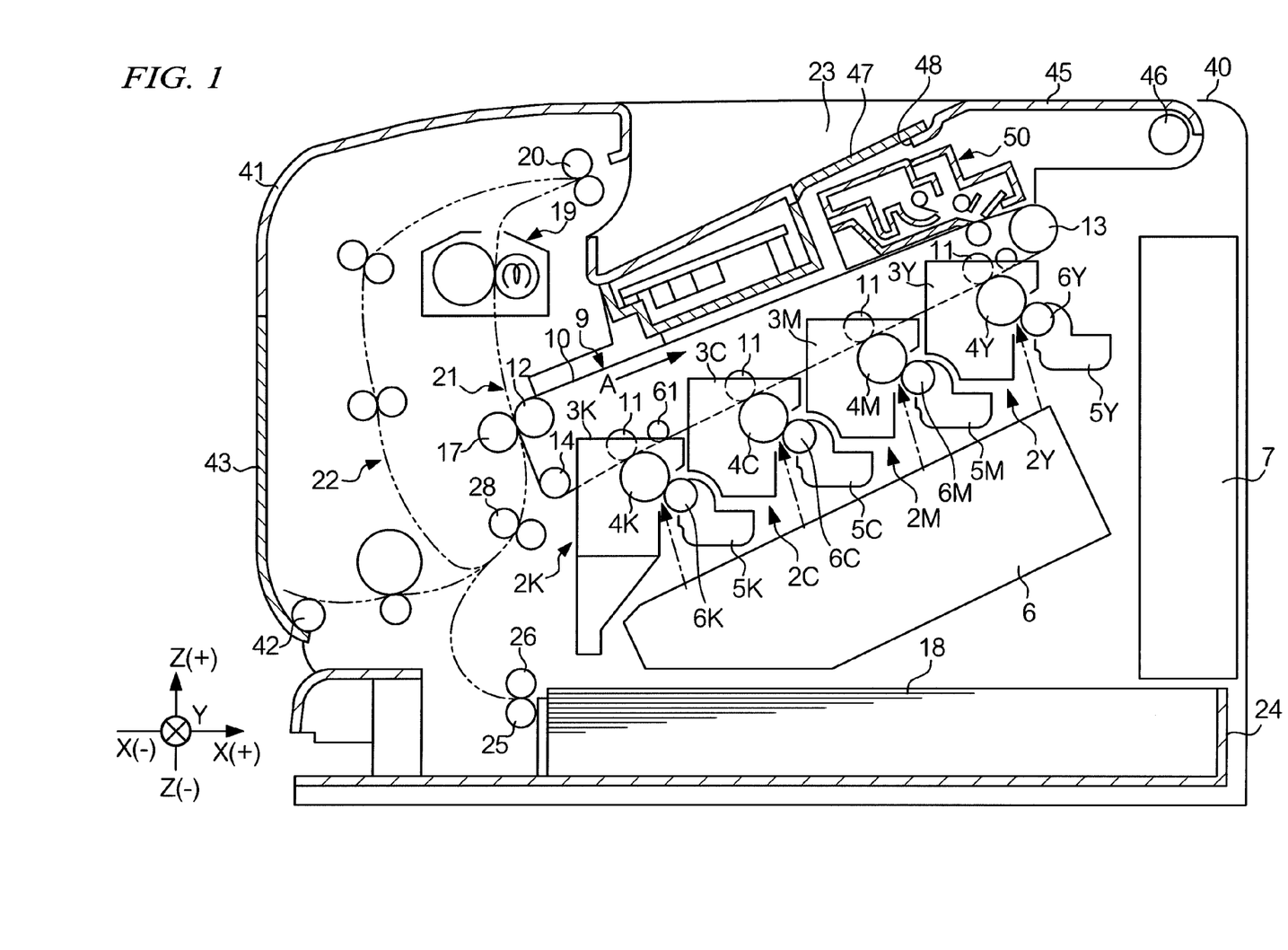
FIG. 1 schematically shows a configuration of an image-forming apparatus according to the exemplary embodiment of the present invention.

In the present exemplary embodiment, an image-forming apparatus provides a function of a printer, a copy machine, or a facsimile machine. FIG. 1 schematically shows a configuration of an image-forming apparatus according to the exemplary embodiment. In the following, description is made of image-forming apparatus 1 viewed from the front, wherein a rearward direction is defined as X(+), a frontward direction is defined as X(−), a leftward direction is defined as Y(+), a rightward direction is defined as Y(−), an upward direction is defined as Z(+), and a downward direction is defined as Z(−).

Configuration of Image-Forming Apparatus

Image-forming apparatus 1 is a tandem type color printer that has image-forming units arranged in tandem along an intermediate transfer belt. Image-forming apparatus 1 has an image-processing device (not shown) inside. The image-processing device performs image processing on image data received from a scanner, a personal computer, a telephone line, or others (not shown). Image-forming apparatus 1 also has four image-forming units 2Y, 2M, 2C, and 2K for yellow (Y), magenta (M), cyan (C), and black (K), respectively. Image-forming units 2Y, 2M, 2C, and 2K are arranged generally in parallel while being spaced apart from each other, and are inclined at a certain angle (for example, 20 degrees) relative to the horizontal direction. In this arrangement, image-forming unit 2Y for yellow (y), whose image is first transferred to the intermediate transfer belt, is located at a relatively higher position, and image-forming unit 2K for black (K), whose image is transferred last to the intermediate transfer belt, is located at a relatively lower position. Due to the arrangement of four image-forming units 2Y, 2M, 2C, and 2K inclined at a certain angle, a length of image-forming units 2Y, 2M, 2C, and 2K becomes shorter in a widthwise direction (an x-axis direction), as compared with a case where image-forming units 2Y, 2M, 2C, and 2K are arranged horizontally.

Each of four image-forming units 2Y, 2M, 2C, and 2K has basically the same configuration; thus four image-forming units 2Y, 2M, 2C, and 2K are, in the following description, collectively referred to as "image-forming unit 2," except where it is necessary to specify otherwise.

Image-forming unit 2 has photosensitive unit 3 and developing unit 5. Photosensitive unit 3 has photosensitive drum 4 serving as an image holder, and a charging device. Photosensitive unit 3 is detachable from device body 40. Developing unit 5 is fixed to device body 40 via a frame (not shown).

Below image-forming units 2Y, 2M, 2C, and 2K, image exposure device 6 is provided. Image exposure device 6 is common to image-forming units 2Y, 2M, 2C, and 2K. Image exposure device 6 has four laser diodes (not shown) for emitting laser beams modulated on the basis of image data. Four laser beams emitted from these laser diodes are deflected by polygon minors. Then the four laser beams respectively reach surfaces of photosensitive drums 4 of image-forming units 2Y, 2M, 2C, and 2K via lens and minors (not shown) to form latent images thereon. The latent images formed on photosensitive drums 4 are developed by developing units 5Y, 5M, 5C, and 5K to form toner images of colors, respectively. Toner images of colors formed sequentially on photosensitive drums 4 of image-forming units 2Y, 2M, 2C, and 2K are transferred in a multi-layered fashion by primary transfer rollers 11 onto the outer circumferential surface of intermediate transfer belt 10. Intermediate transfer belt 10 serving as an intermediate transfer member is arranged above image forming units 2Y, 2M, 2C, and 2K.

Intermediate transfer belt 10 is an endless belt-shaped member tension-supported by plural rollers such as drive roller 12, tensioning roller 13, and idler roller 14. Intermediate transfer belt 10 is cyclically driven in a direction of arrow A by drive roller 12, which is rotary driven by a drive motor (not shown). The underside of intermediate transfer belt 10 is inclined relative to the horizontal direction so that the underside moves toward a lower position. The underside of intermediate transfer belt 10 contacts photosensitive drums 4Y, 4M, 4C, and 4K of image-forming units 2Y, 2M, 2C, and 2K. Intermediate belt 10, a flexible film made of a synthetic resin, such as polyimide, may be used, where the ends of the synthetic resin film are connected by means of welding or the like to form an endless belt member.

Intermediate transfer belt 10, primary transfer rollers 11, drive roller 12, tensioning roller 13, and idler roller 14 constitute intermediate transfer unit 9.

Image-forming apparatus 1 has sheet container 24 inside. Sheet container 24 stores recording sheets 18, each serving as a recording medium, having a determined size and material. Recording sheets 18 are conveyed, one sheet at a time, from sheet container 24 along sheet path 21 formed by rollers. In sheet path 21, recording sheets 18 are separated individually and conveyed to registration roller 28 by way of feed roller 25 and roller 26 for sheet separation and conveyance, and then caused to stop there temporarily. From there, recording sheet 18 is further conveyed to a secondary transfer position on intermediate transfer belt 10 by registration roller 28, which is rotary driven at a predetermined timing. At the secondary transfer position, secondary transfer roller 17 is provided. Secondary transfer roller 17 contacts the surface of intermediate transfer belt 10 with pressure. Secondary transfer roller 17 presses against drive roller 12 a toner image of yellow (Y), magenta (M), cyan (C), and black (K), which have been transferred in a multi-layered fashion onto intermediate transfer belt 10, whereby secondary transfer of the toner image onto the recording sheet 18 is made, owing to pressure and electrostatic force. After the secondary transfer process, recording sheet 18, on which the toner image of multiple colors has been transferred, is subjected to a fixing process in which heat and pressure are applied by fixing device 19. Thereafter, recording sheet 18 is output by output roller 20 onto sheet receiving unit 23, which is provided on the top of image-forming apparatus 1. In sheet path 21, invert mechanism 22 is also provided to invert both sides of recording sheet 18.

Structure of Image-Forming Apparatus

Figure 2:
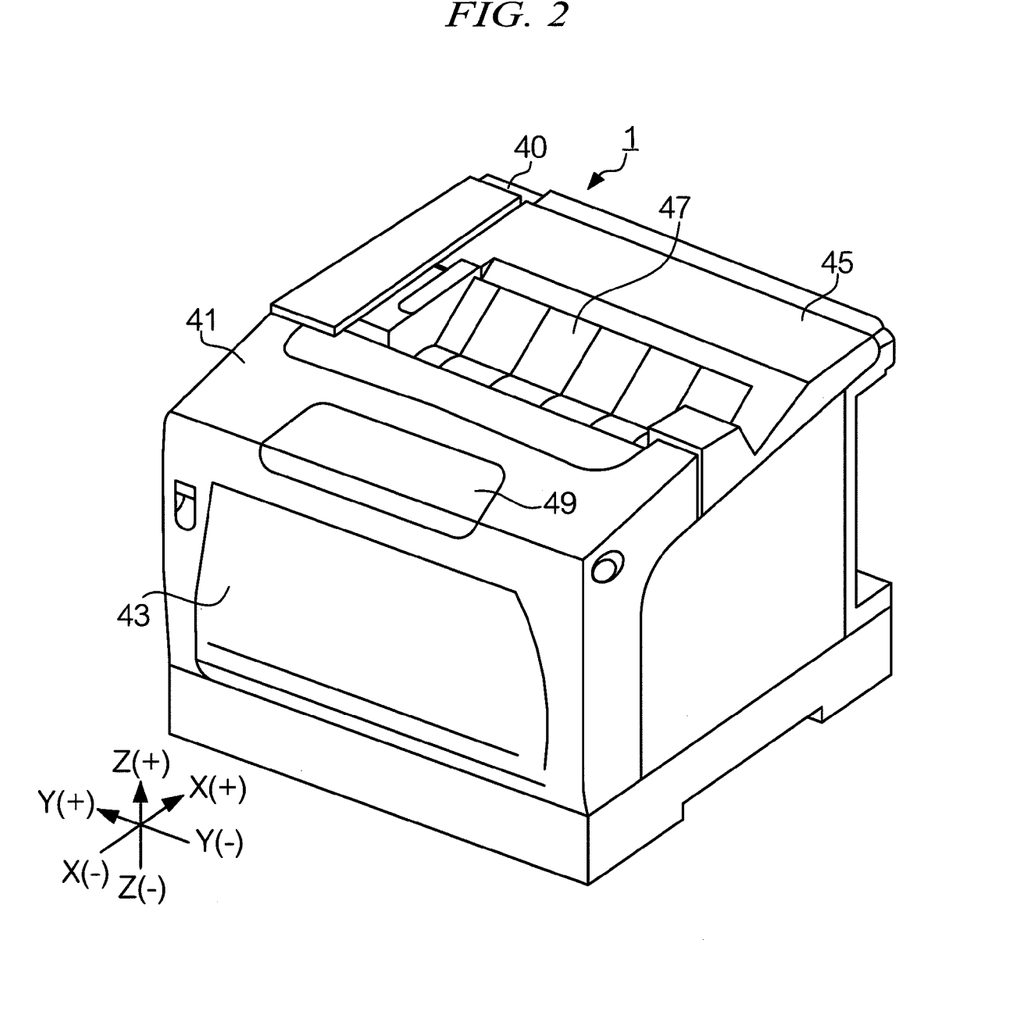
FIG. 2 is a perspective view of an exterior of the image-forming apparatus.
Figure 3:
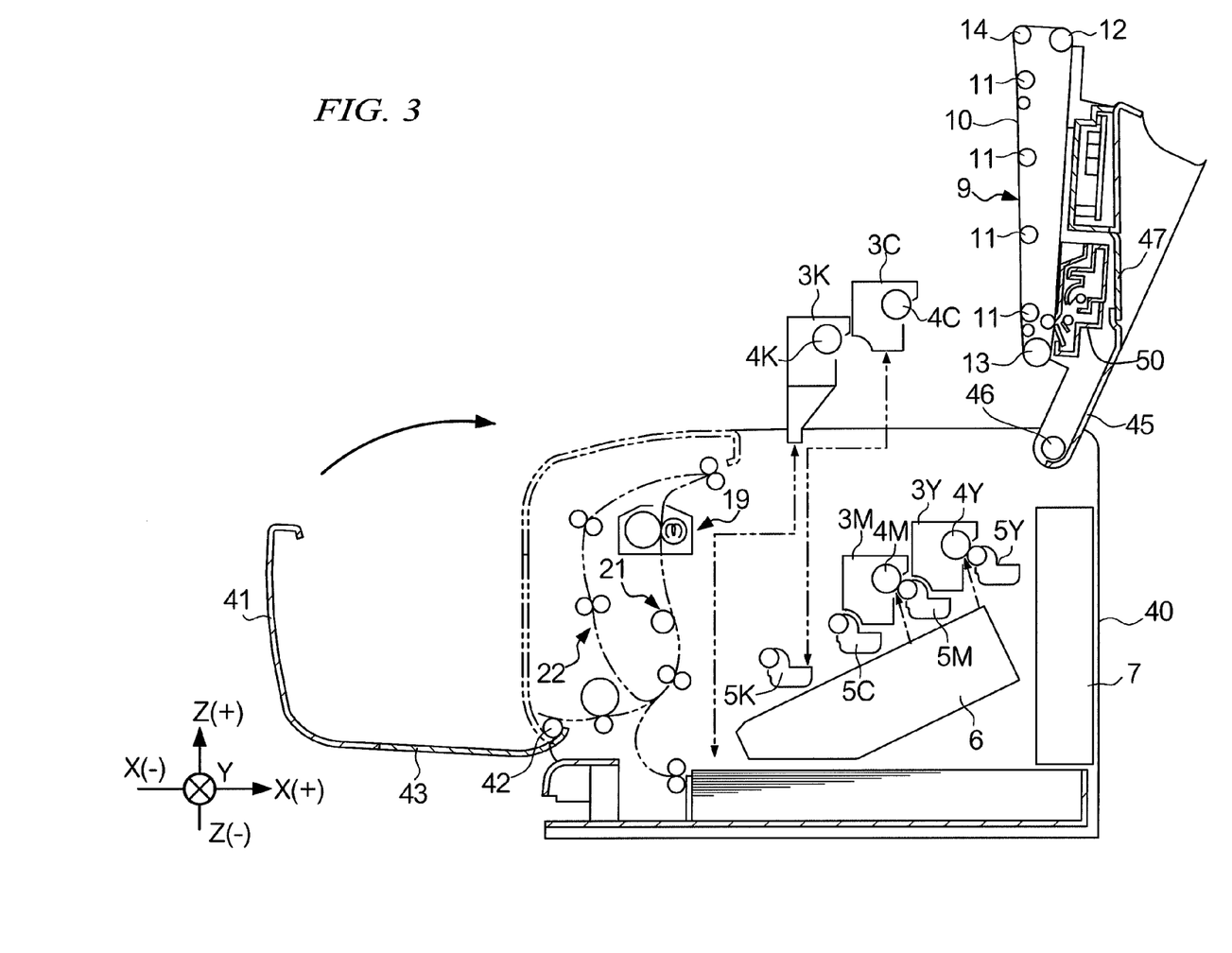
FIG. 3 is a cross-sectional view of the image-forming apparatus when a cover is opened.

Next, description will be given of a structure of image-forming apparatus 1, with reference to FIGS. 1 to 3. FIG. 2 is a perspective view of an exterior of the image-forming apparatus. FIG. 3 shows the inside of image-forming apparatus 1 when a cover is opened.

Image-forming apparatus 1 has openable members 41 and 43 attached to the side of device body 40. Openable members 41 and 43 are capable of being opened about supporting shaft 42. Openable member 43 is normally closed; however, when a different type of recording sheet from the recording sheet stored in sheet container 24 is used, openable member 43 is opened to feed the recording sheet from there to sheet path 21.

Cover 45 is provided on the top of device body 40. Cover 45 is capable of being opened about supporting shaft 46. The upper surface of cover 45 functions as sheet-receiving unit 23 that receives output recording sheet 18 on which a toner image is formed. Operating unit 49 is also provided on the top of device body 40. Operating unit 49 has, for example, a numeric keypad used for inputting a number of a recording medium.

Cover 45 is normally closed to cover device body 40; however when photosensitive units 3Y, 3M, 3C, and 3B are attached to or removed from device body 40, cover 45 is opened. To prevent intermediate transfer unit 9 attached along the inner side of cover 45 from contacting openable member 41, openable member 41 is opened prior to opening cover 45. On the other hand, when openable member 41 is closed to cover device body 40, cover 45 is opened prior to closing openable member 41.

Supporting Structure of Photosensitive Drum

Figure 4:
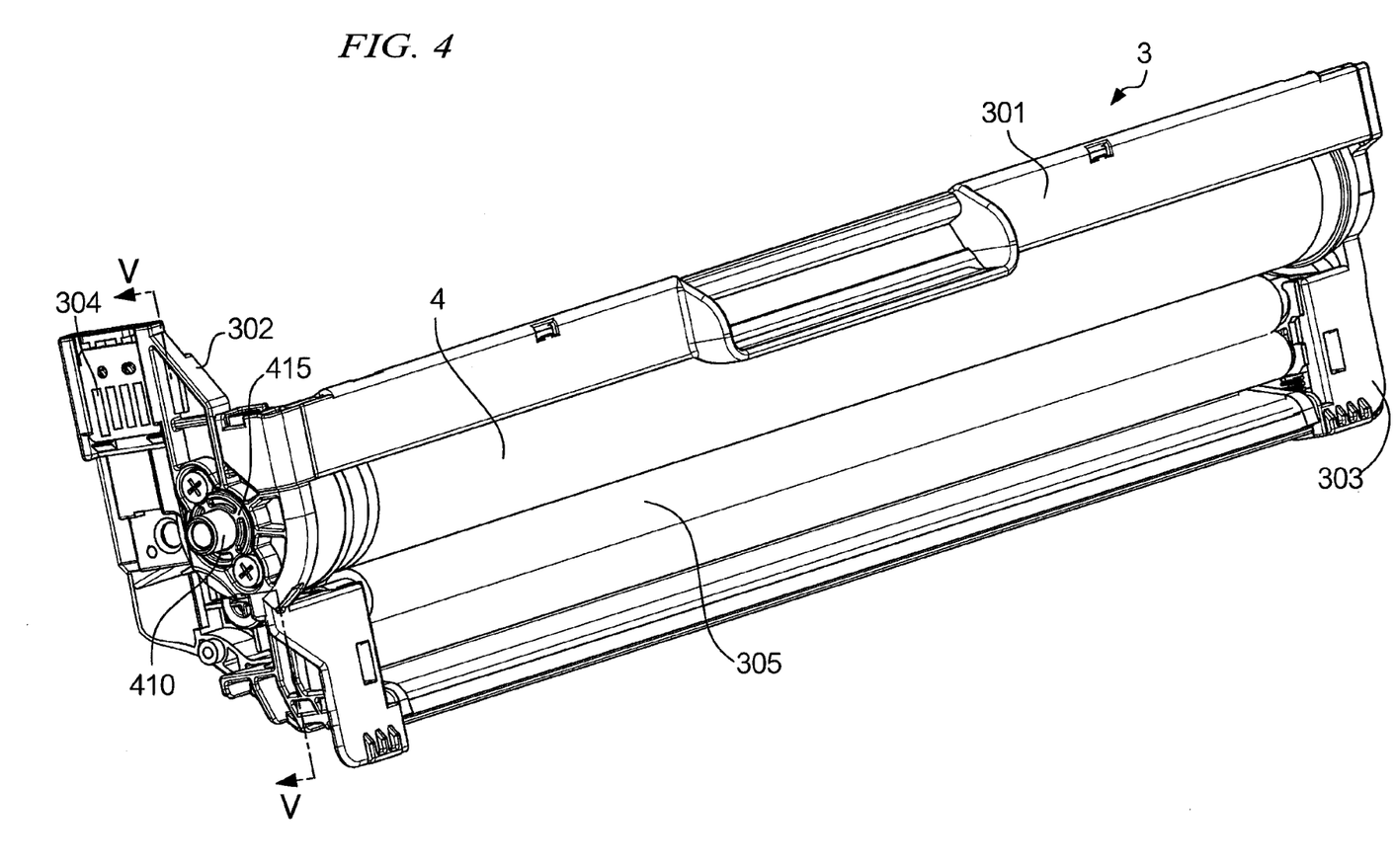
FIG. 4 is a perspective view of a photosensitive drum.
Figure 5:
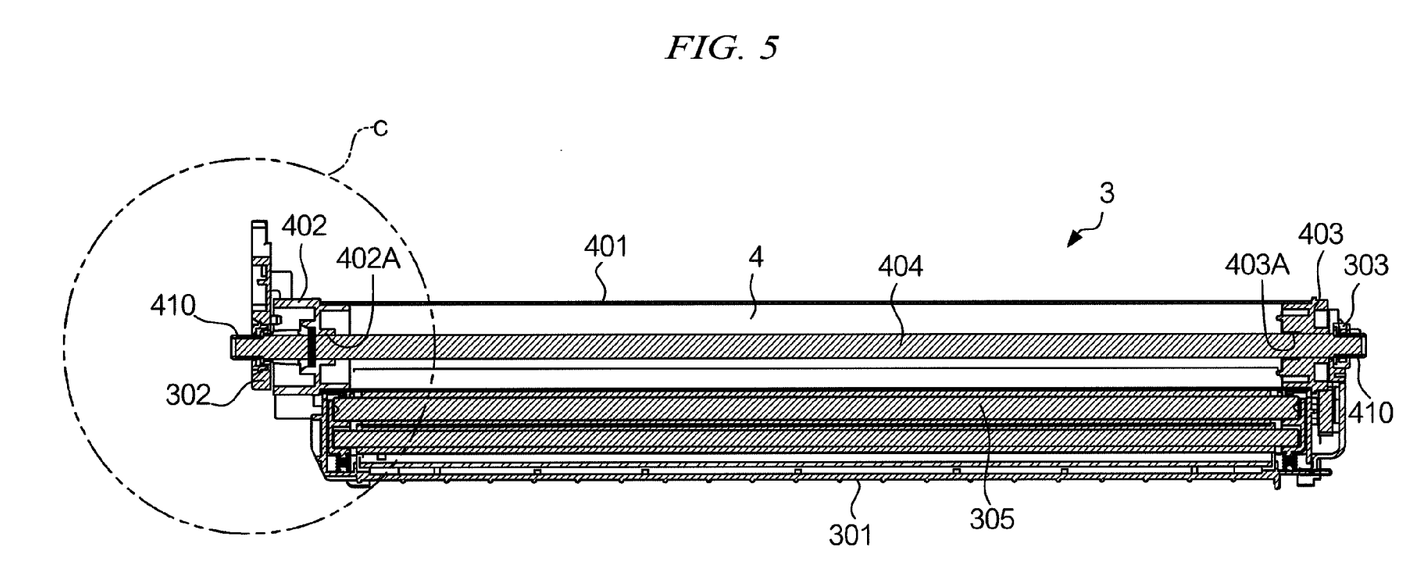
FIG. 5 is a cross-sectional view as viewed in arrow V-V of FIG. 4.
Figure 6:
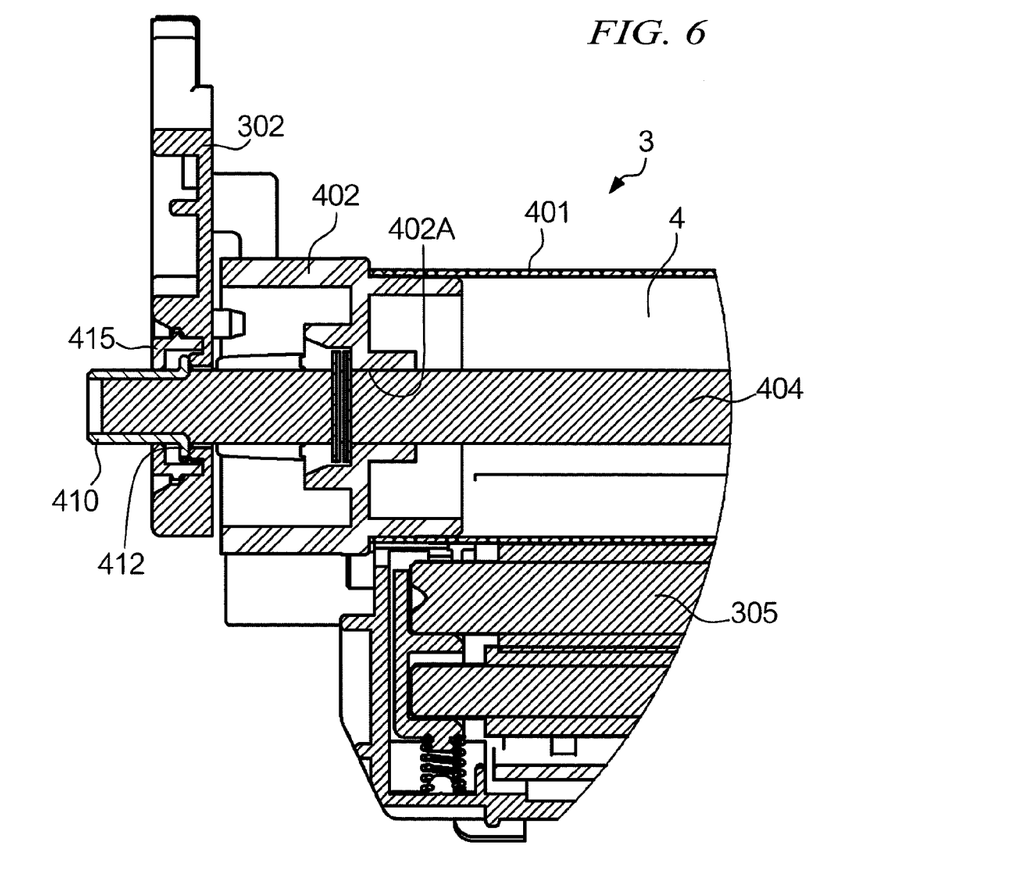
FIG. 6 is an enlarged view of part c of FIG. 5.
Figure 7:
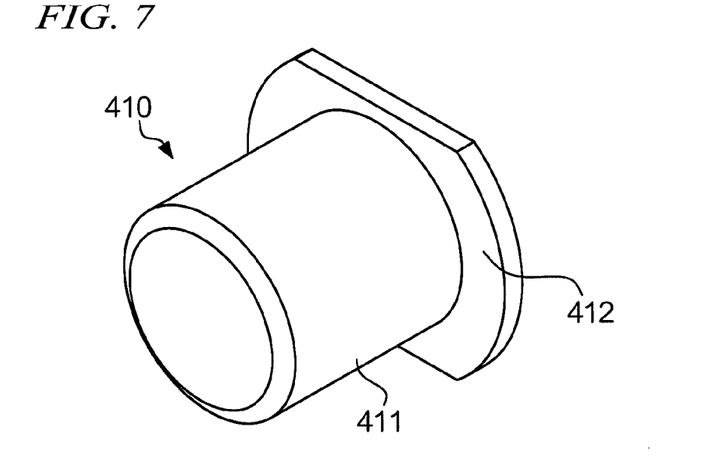
FIG. 7 is a perspective view of a bearing.
Figure 8:
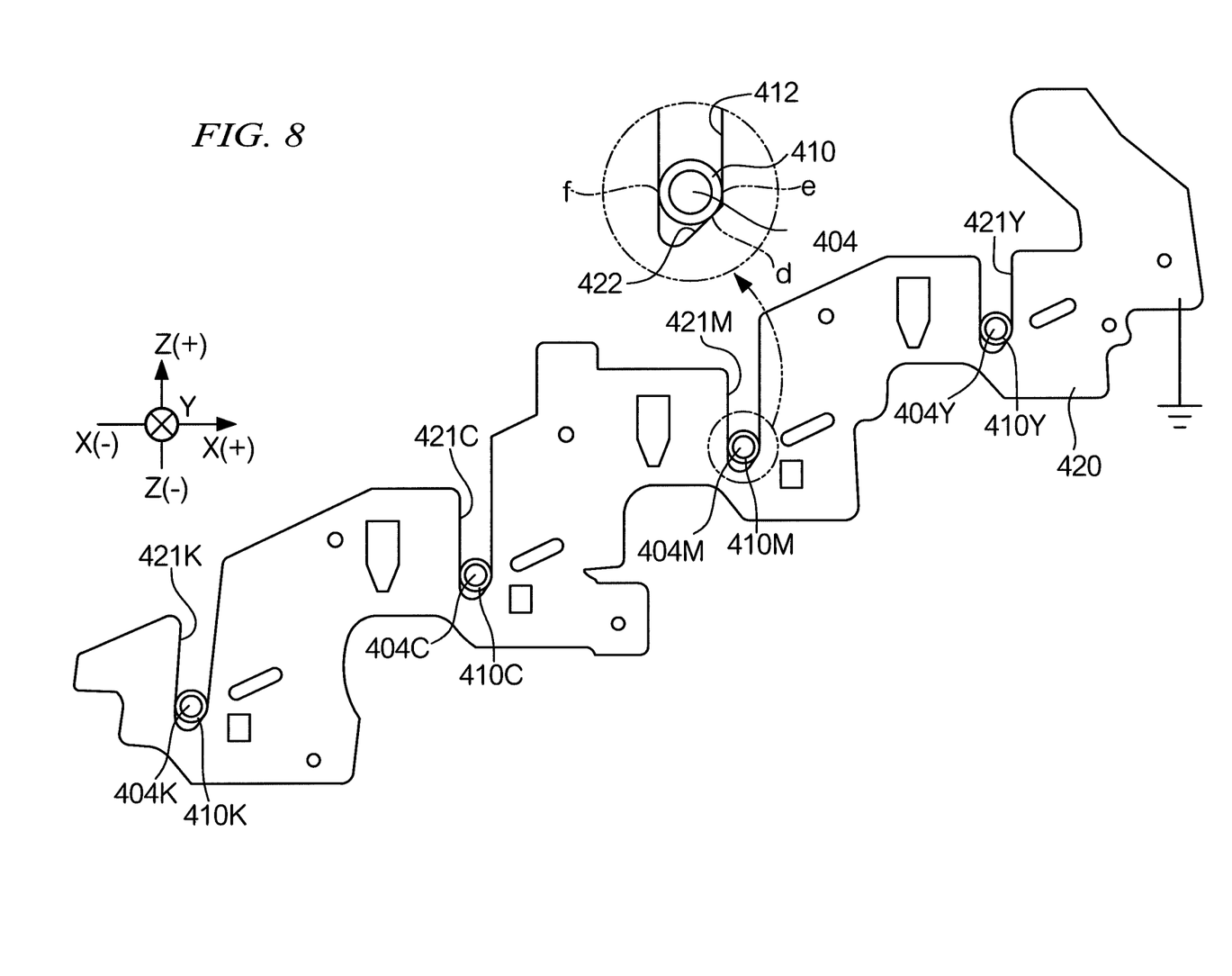
FIG. 8 shows a supporting plate to support a shaft of the photosensitive drum.

Next, description is given of a supporting structure that supports photosensitive drum 4 of photosensitive unit 3, with reference to FIGS. 4 to 8. FIG. 4 is a perspective view of photosensitive unit 3. FIG. 5 is a cross-sectional view as viewed in a direction indicated by arrow V-V of FIG. 4. FIG. 6 is an enlarged view of part c of FIG. 5. FIG. 7 is a perspective view of a bearing. FIG. 8 shows a supporting plate to support a shaft of a photosensitive drum.

Photosensitive unit 3 has unit body 301 made of resin. Unit body 301 has flange units 302 and 303 on both sides, respectively. Flange units 302 and 303 support both longitudinal sides of each of photosensitive drum 4, charging roller 305, and others, so that photosensitive drum 4, charging roller 305, and others can rotate. The one side of flange unit 302 has conductive terminal unit 304 exposed to the outside. Terminal unit 304 is electronically connected to a substrate (not shown) on which electronic parts are mounted, contained in flange unit 302. The electronic parts provide a memory function to record data on an operational status of photosensitive unit 3 (for example, number of rotations and problems of photosensitive drum 4). These data are retrieved via terminal unit 304.

Photosensitive drum 4 has drum 401 as shown in FIG. 5. Drum 401 is formed of a metallic cylinder, which is made of a material such as aluminum, on which an undercoat layer, a charge generation layer, and a charge transfer layer are laminated and formed. Both sides of drum 401 are covered by covers 402 and 403 made of an insulation material. Drum 401 has rotating shaft 404 made of a conductive material (for example, a stainless steel rod) at the center of an axis. Rotating shaft 404 is provided such that its ends respectively protrude through holes 402A and 403A of covers 402 and 403 to the outside.

Both sides of rotating shaft 404 are respectively inserted into bearings 410, each serving as a sliding bearing. Bearings 410 are fixed to flange units 302 and 303 by bearing fixtures 415, respectively. Each bearing 410 is made of a sintered compact produced by compression molding of metal powder including graphite and sintering at a temperature below a melting point. Each bearing 410 has cylindrical tube 411. As shown in FIG. 7, tube 411 has flange 412 formed on one aperture portion. Each flange 412 has two parallel chords that are made by cutting edges of a disk. When flanges 412 are inserted into recesses (not shown) formed on flange units 302 and 303, bearings 410 are whirl-stopped to flange units 302 and 303.

The sintered compact of bearing 410 has an infinite number of infinitesimal stomas; accordingly a surface of tube 411 also has infinitesimal stomas. While rotating shaft 404 is inserted into bearing 410, the outer circumferential surface of rotating shaft 404 and the inner circumferential surface of tube 411 are in contact with each other. Due to an infinite number of infinitesimal stomas formed on the inner circumferential surface of tube 411, an area where the outer circumferential surface of rotating shaft 404 and the inner circumferential surface of tube 411 contact each other is reduced, as compared with a case where the inner circumferential surface of tube 411 has no infinitesimal stoma. When a contact area with the rotating shaft is reduced, a frictional resistance between bearing 410 and rotating shaft 404 is also reduced. In this manner, bearing 410 supports rotating shaft 404 inserted into tube 411 so that rotating shaft 404 is able to rotate.

The sintered compact, which is a material of bearing 410, is made of a material including graphite. The sintered compact is a conductive material having a value of surface electrical resistance smaller than $10^7$ ohm. Bearing 410, therefore, serves as a conductor that allows an electric current to flow. "Conductive material" referred to here is a material having an electric resistance capable of making an electronic connection needed for grounding of rotating shaft 404. In particular, the sintered compact used for a material of bearing 410 may have a small value of the electric resistance to pass through electricity easily. The sintered compact is formed without any inclusion of oil in order to have a small value of the electric resistance and pass through electricity easily. However, there is no problem in including a small amount of oil in the sintered compact if the electric resistance capable of making an electronic connection needed for grounding of rotating shaft 404 is maintained.

In image-forming apparatus 1, rotating shaft 404 of photosensitive drum 4 is rotatably supported by a rotating shaft supporting mechanism, and rotating shaft 404 is electronically grounded. The rotating shaft supporting mechanism has conductive bearing 410, and supporting plate 420, serving as supporting portion to support bearing 410. In employing this structure, it is not required to provide in device body 40 a member such as a coupling means, a coiled conductive member, or a conductive member that has a plate of a spring-like shape (a leg portion), separated from a bearing to support the rotating shaft 404. Thus, a number of components used for grounding of a rotating shaft are reduced. As a result, image-forming apparatus 1 can be of a reduced size. In addition, bearing 410 made of the sintered compact increases abrasion resistance, as compared with a resin bearing impregnated with conductive fiber.

Configuration of Supporting Plate

Supporting plates 420 support rotating shafts 404 of photosensitive drums 4. Supporting plates 420 are attached to a frame (not shown) maintaining a space between device body 40 in a rearward direction (X(+)) and a frontward direction (X(−)). Supporting plates 420 are grounded via the frame. Each of supporting plates 420 has cuts 421Y, 421M, 421C, and 421K equally spaced apart from each other. Cuts 421Y, 421M, 421C, and 421K open in the upward direction (Z(+)), and extend in the downward direction (Z(−)). Each of cuts 421Y, 421M, 421C, and 421K contacts the circumferential surface of bearing 410 to support bearing 410 from underneath. Each of cuts 421Y, 421M, 421C, and 421K (indicated by 421 in the enlarged view of FIG. 8) has inclined edge 422, which is inclined relative to the horizontal direction (X-axis), in a contact portion with bearing 410.

While rotating shaft 404 with bearing 410 is inserted into cut 421, the weight of photosensitive unit 3 is added to bearing 410 in the downward direction (Z(−)). Therefore, bearing 410 is pressed against inclined edge 422 as shown in the enlarged view of FIG. 8.

The circumferential surface of bearing 410 contacts cut 421 at d point, e point, and f point. Therefore, conduction between rotating shaft 404 and supporting plate 420 is facilitated better as compared with a case, for example, of a cut formed in an arc shape along the circumferential surface of bearing 410 contacting the circumferential surface of bearing 410 at a liner region.

In other words, if a cut is formed in an arc shape, it is difficult to contact a circumferential surface of a bearing with an arc portion of a cut without a space, and a passage of electric current between the bearing and a supporting member becomes more difficult because the space makes an electrical resistance. However, when a circumferential surface of bearing 410 contacts cut 421 at three points, an electrical resistance due to a space rarely occurs, thus conduction between rotating shaft 404 and supporting plate 420 is facilitated.

In addition, due to a weight of photosensitive unit 3 added to hearing 410, bearing 410 is pressed against cut 421 and it is difficult to separate the circumferential surface of bearing 410 from cut 421, thus conduction between bearing 410 and supporting plates 420 is facilitated further.

Two supporting plates 420 located on either side of rotating shaft 404 are made of the same metallic conductive material and of the same thickness. Additionally, two supporting plates 410 are overlapped during processing to form cuts 421 and other holes. In employing this method, burr and distortion of cuts 421 that occur in the two supporting plates 420 during processing are made uniform. As a result, misregistration on both sides of rotating shaft 404 is prevented.

2. Modification

The foregoing exemplary embodiment may be modified as described below.

In the exemplary embodiment, cut 421 has an inclined edge 422 that contacts bearing 410. However, a shape of the edge is merely an example. Any shaped edge may be employed if the circumferential surface of bearing 410 has a contact point with cut 421.

In the exemplary embodiment, the circumferential surface of bearing 410 contacts supporting plate 420 at three points, d point, e point, and f point, as shown in the enlarged view of FIG. 8. However, the circumferential surface may contact supporting plate 420 at two points that are a combination of d point and e point, or d point and f point. A cut may have a shape such that the cut contacts bearing 410 at four or more points.

Both sides of rotating shaft 404 are rotatably supported by bearings 410; however, one side of rotating shaft 404 may be supported by bearing 410, and the other side of rotating shaft 404 may be supported by a nonconductive bearing.

In the exemplary embodiment, bearing 410 is made of the sintered compact including graphite; however, bearing 410 may be made of a sintered compact including a material other than graphite if conductivity is to be maintained.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiments have been chosen and described so that the principles of the invention and its practical applications are explained best, thereby enabling others skilled in the art to understand the invention for use with various embodiments and with various modifications as suited to a particular use contemplated. It is intended that the scope of the invention be defined by the following claims and their equivalents.

The invention claimed is:

1. An image-forming apparatus comprising:
an image-forming unit that includes an image holder having a rotating shaft, and forms an image on the image holder;
a bearing made of a conductive sintered compact, that contacts and supports the rotating shaft so that the rotating shaft is able to rotate; and
a metallic supporting portion that is electrically grounded, and has a cut that contacts and supports the bearing, wherein
the cut includes two linear portions parallel to each other, and a bottom portion inclined relative to a horizontal direction,
the cut contacts a circumferential surface of the bearing at three points included in the two linear portions and the bottom portion, respectively, and
the bearing has a first end into which the rotating shaft is inserted and a second end that opposes the first end, and the rotating shaft does not extend beyond the second end.

2. The image-forming apparatus according to claim 1, wherein:
the bearing has a cylindrical shape.

3. The image-forming apparatus according to claim 1, wherein the metallic supporting portion is electrically connected to the bearing.

4. The image-forming apparatus according to claim 3, wherein the bearing is electrically connected to the image-forming unit via the rotating shaft.

5. An image-forming apparatus comprising:
- an image-forming unit that includes an image holder having a rotating shaft, and forms an image on the image holder;
- a bearing made of a conductive sintered compact, that contacts and supports the rotating shaft so that the rotating shaft is able to rotate; and
- a metallic supporting portion that is electrically grounded, and has a cut that contacts and supports the bearing, wherein
- the cut includes two linear portions parallel to each other, and a bottom portion inclined relative to a horizontal direction,
- the out contacts a circumferential surface of the bearing at three points included in the two linear portions and the bottom portion, respectively, and
- the bearing has a cylindrical shape with a flange formed at one aperture portion of the bearing.

6. The image-forming apparatus according to claim 5, wherein the flange includes two parallel chords.

* * * * *